(12) United States Patent
Masuki et al.

(10) Patent No.: US 11,644,638 B2
(45) Date of Patent: May 9, 2023

(54) LENS APPARATUS AND IMAGE PICKUP APPARATUS

(71) Applicant: CANON KABUSHIKI KAISHA, Tokyo (JP)

(72) Inventors: Akihiko Masuki, Kawasaki (JP); Kenta Takai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 391 days.

(21) Appl. No.: 16/935,354

(22) Filed: Jul. 22, 2020

(65) Prior Publication Data

US 2021/0033817 A1 Feb. 4, 2021

(30) Foreign Application Priority Data

Jul. 29, 2019 (JP) .............................. JP2019-138602

(51) Int. Cl.
*G02B 7/09* (2021.01)
*G02B 27/64* (2006.01)
*G03B 5/06* (2021.01)
*G03B 13/36* (2021.01)

(52) U.S. Cl.
CPC .............. *G02B 7/09* (2013.01); *G02B 27/646* (2013.01); *G03B 5/06* (2013.01); *G03B 13/36* (2013.01); *G03B 2205/0023* (2013.01); *G03B 2205/0069* (2013.01)

(58) Field of Classification Search
CPC .......... G02B 7/09; G02B 27/646; G02B 7/10; G03B 5/06; G03B 13/36; G03B 2205/0023; G03B 2205/0069
See application file for complete search history.

(56) References Cited

U.S. PATENT DOCUMENTS

2017/0115467 A1* 4/2017 Tanaka ................. G02B 15/143
2020/0077025 A1* 3/2020 Yoshida ................. G02B 7/021

FOREIGN PATENT DOCUMENTS

| JP | 2006-078563 A | 3/2006 |
|----|---------------|--------|
| JP | 2017-129641 A | 7/2017 |

* cited by examiner

*Primary Examiner* — Cara E Rakowski
(74) *Attorney, Agent, or Firm* — Cowan, Liebowitz & Latman, P.C.

(57) ABSTRACT

A lens apparatus includes a first lens holder held by a first cam follower and movable in an optical axis direction, a second lens holder held by a second cam follower and movable in the optical axis direction, and a biasing member provided between the first lens holder and the second lens holder. The biasing member is disposed at the same phase as that of at least one of the first cam follower and the second cam follower and closer to an optical axis than the at least one when viewed from the optical axis direction, and overlaps the at least one in the optical axis direction.

11 Claims, 9 Drawing Sheets

LENS APPARATUS AND IMAGE PICKUP APPARATUS

BACKGROUND OF THE INVENTION

Field of the Invention

The present invention relates to a lens apparatus and an image pickup apparatus.

Description of the Related Art

One conventional lens apparatus includes a biasing member provided between a plurality of lens holding frames while independently moving the plurality of lens holding frames, so as to suppress inclinations between the plurality of lens holding frames. For example, Japanese Patent Laid-Open No. ("JP") 2006-078563 discloses a lens apparatus in which three elastic members are disposed between two lens holding frames and the two lens holding frames are attracted to each other so as to allow only tilting in the same direction. JP 2017-129641 discloses a lens apparatus that crosswise hangs two elastic members across three lens holding frames to remove looseness of the three lens holding frames and to allow only tilting in the same direction.

Since the lens apparatus disclosed in JP 2006-078563 restricts the length of the elastic member between the two lens holding frames, and thus needs to increase the spring constant. As a result, a driving load for the lens holding frame increases. In the lens apparatus disclosed in JP 2017-129641, since the space around the lens holding frame is occupied by the two elastic members, it is difficult to dispose another member. If another member is to be disposed around the lens holding frame in the lens apparatus disclosed in JP 2017-129641, it is necessary to dispose the other member outside the two elastic members. As a result, the lens apparatus becomes large.

SUMMARY OF THE INVENTION

The present invention provides a low-load and compact lens apparatus and an image pickup apparatus, each of which can hold a lens holder with high accuracy.

A lens apparatus according to one aspect of the present invention includes a first lens holder held by a first cam follower and movable in an optical axis direction, a second lens holder held by a second cam follower and movable in the optical axis direction, and a biasing member provided between the first lens holder and the second lens holder. The biasing member is disposed at the same phase as that of at least one of the first cam follower and the second cam follower and closer to an optical axis than the at least one when viewed from the optical axis direction, and overlaps the at least one in the optical axis direction.

A lens apparatus according to another aspect of the present invention includes a first lens holder held by a first cam follower and movable in an optical axis direction, a second lens holder including an image stabilizing mechanism, the second lens holder being held by a second cam follower and movable in the optical axis direction, and a biasing member provided between the first lens holder and the second lens holder. The image stabilizing mechanism includes a cover member having a first contact portion that contacts the biasing member, a plurality of yokes, and a yoke holder configured to hold the plurality of yokes. The first contact portion overlaps at least part of the yoke holder when viewed from the optical axis direction.

An image pickup apparatus having the above lens apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Basic Structure of Image Pickup Apparatus

Figure 1:
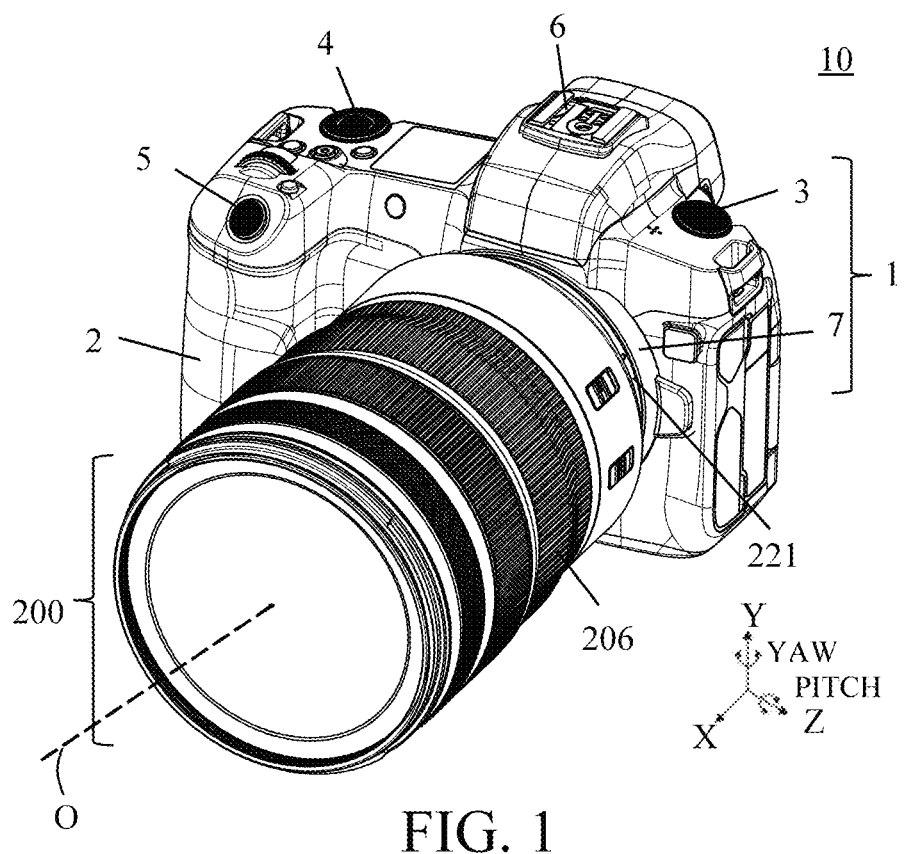
FIG. 1 is a front perspective view of an image pickup apparatus according to this embodiment.
Figure 2:
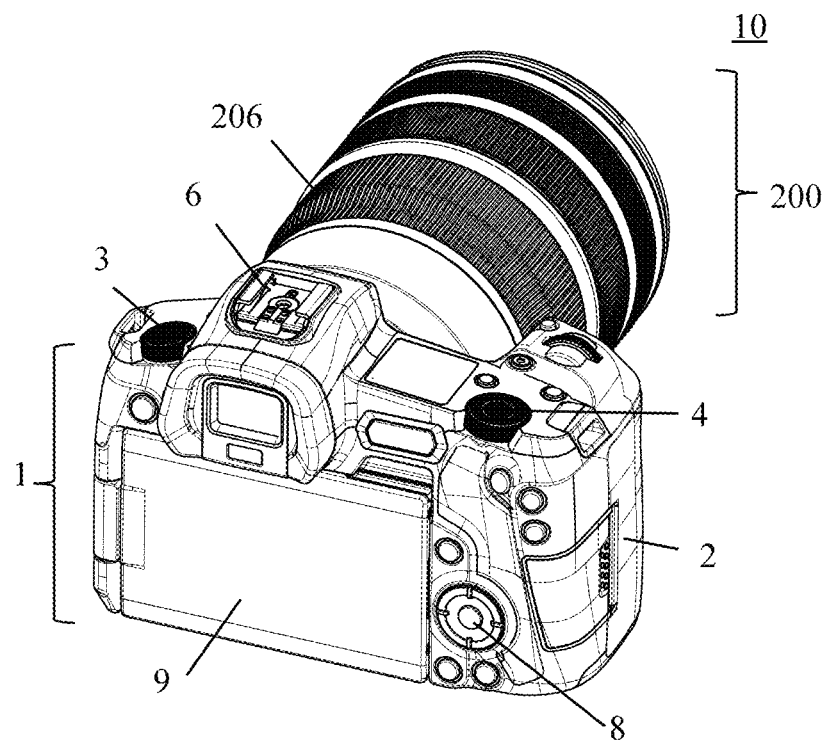
FIG. 2 is a rear perspective view of the image pickup apparatus according to this embodiment.

Referring now to FIGS. 1 and 2, a description will be given of an image pickup apparatus according to this embodiment. FIGS. 1 and 2 are external views of an image pickup apparatus (digital camera) 10 according to this embodiment. FIG. 1 is a front perspective view, and FIG. 2 is a rear perspective view. The image pickup apparatus 10 includes a camera body (image pickup apparatus body) 1 and a lens apparatus (interchangeable lens) 200 that is attachable to and detachable from the camera body 1. However, the present invention is not limited to this embodiment, and is also applicable to an image pickup apparatus in which a lens apparatus and a camera body are integrated with each other.

As illustrated in FIG. 1, a direction (optical axis direction) along an optical axis O of an imaging optical system housed in the lens apparatus 200 is set to an X-axis direction, and a direction orthogonal to the X-axis is set to a Z-axis direction (horizontal direction) and a Y-axis direction (vertical direction). Hereinafter, the Z-axis direction and the Y-axis direction will be collectively referred to as Z/Y-axes directions. The rotation direction around the Z-axis is set to the pitch direction, and the rotation direction around the Y-axis is set to the yaw direction. The pitch direction and the yaw direction (collectively referred to as the pitch/yaw directions hereinafter) are rotation directions around two axes that are the Z-axis and the Y-axis that are orthogonal to each other.

A grip portion 2 for a user to grip the camera body 1 with his hand is provided on the left side (right side when viewed from the rear) of the camera body 1 when viewed from the front (object side). A power operating unit 3 is disposed on the top surface of the camera body 1. When the user turns on the power operating unit 3 while the camera body 1 is powered off, the camera body 1 becomes powered on and image capturing is available. When the user turns off the power operating unit 3 while the camera body 1 is powered on, the camera body 1 becomes powered off.

A mode dial 4, a release button 5, and an accessory shoe 6 are provided on the top surface of the camera body 1. An imaging mode can be switched by the user rotating the mode dial 4. The imaging mode includes a manual still imaging mode in which the user can arbitrarily set an imaging condition such as a shutter speed and an F-number (aperture value), an automatic still imaging mode in which a proper exposure amount is automatically obtained, a motion image imaging mode, and the like. When the user half-presses the release button 5, an imaging preparation operation such as autofocus and auto-exposure control can be instructed, and when the user fully presses the release button 5, he can instruct imaging. An accessory such as an external flash or an external viewfinder (EVF) (not illustrated) is detachably attached to the accessory shoe 6. The camera body 1 is provided with an image sensor 15 that photoelectrically converts (images) an object image (optical image) formed by the imaging optical system of the lens apparatus 200.

The lens apparatus 200 is mechanically and electrically connected to a camera mount 7 provided to the camera body 1 via a lens mount 221. As described above, the lens apparatus 200 houses the imaging optical system that forms the object image by imaging the light from the object. A zoom operating ring 206 that is rotatable around the optical axis by a user operation is provided to the outer circumference of the lens apparatus 200. A knurled shape is provided on the outer circumferential part of the zoom operating ring 206 so that the user's hand does not slip when operating the zoom operating ring 206. When the zoom operating ring 206 is rotated by the user, the zoom unit forming the imaging optical system moves to a predetermined optical position corresponding to the rotation angle of the zoom operating ring 206. Thereby, the user can capture an image at a desired angle of view.

As illustrated in FIG. 2, a rear operating unit 8 and a display unit 9 are provided on the rear surface of the camera body 1. The rear operating unit 8 includes a plurality of buttons and dials to which various functions are assigned. When the camera body 1 is powered on and the still or motion imaging mode is set, a through image of the object image captured by the image sensor 15 is displayed on the display unit 9. The display unit 9 displays an imaging parameter indicating the imaging condition such as the shutter speed and the F-number, and the user can change the set value of the imaging parameter by operating the rear operating unit 8 while watching the display. The rear operating unit 8 includes a reproduction button for instructing a reproduction of the recorded captured image, and when the user operates the reproduction button, the captured image is reproduced and displayed on the display unit 9.

Figure 3:
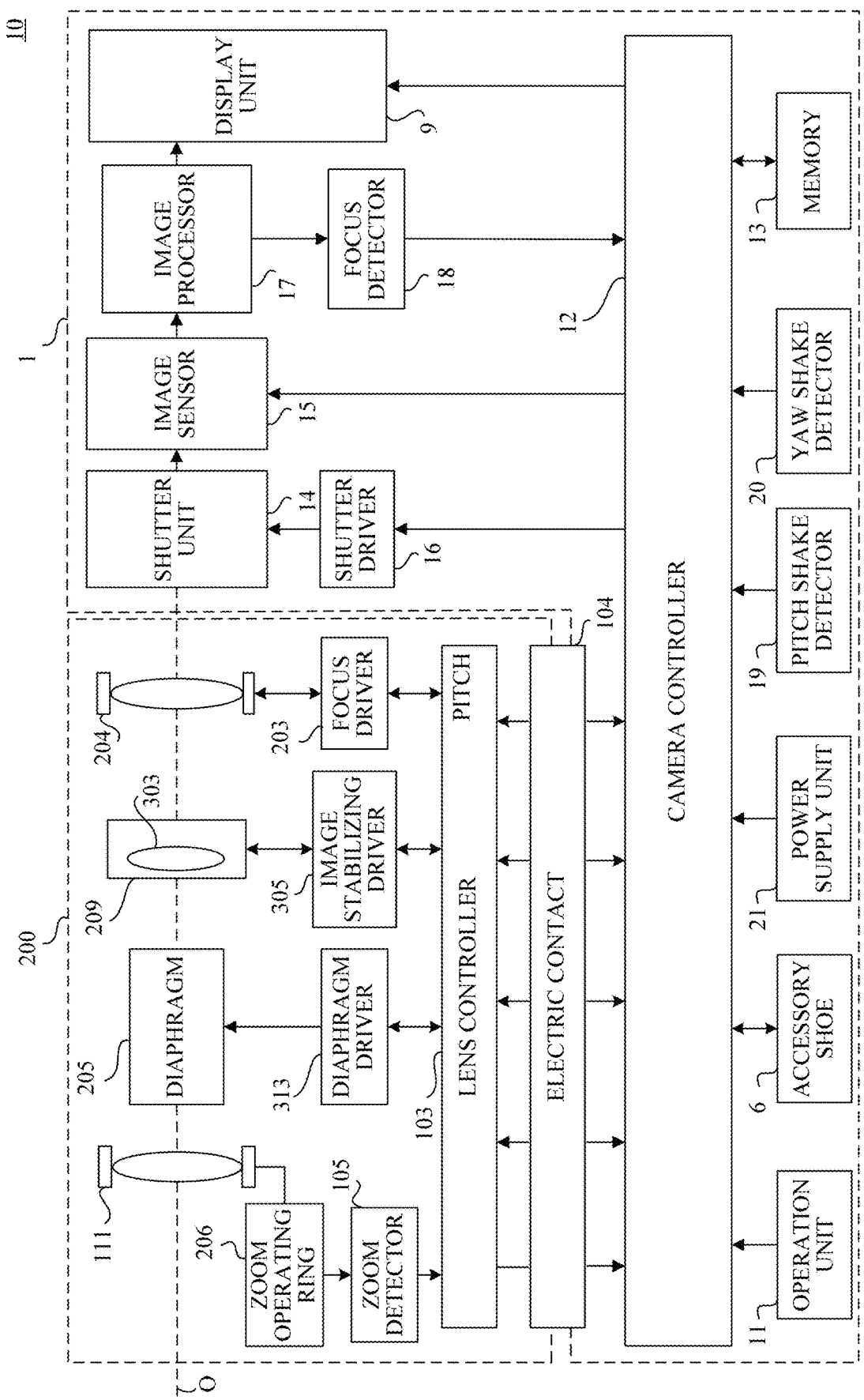
FIG. 3 is a block diagram of an image pickup apparatus according to this embodiment.

Referring now to FIG. 3, a description will be given of an electrical and optical configuration of the image pickup apparatus 10. FIG. 3 is a block diagram of the image pickup apparatus 10. The camera body 1 includes a power supply unit 21 that supplies the electric power to the camera body 1 and the lens apparatus 200, the operation unit 11 having a touch panel function of the power operating unit 3, the mode dial 4, the release button 5, the rear operating unit 8, and the display unit 9. The overall system control of the camera body 1 and the lens apparatus 200 is performed by a camera controller 12 provided in the camera body 1 and a lens controller 103 provided in the lens apparatus 200 cooperating with each other. The camera controller 12 reads out and executes a computer program stored in a memory 13. Then, the camera controller 12 communicates various control signals and data with the lens controller 103 via the communication terminal of an electrical contact 104 provided on the lens mount 221. The electrical contact 104 includes a power terminal that supplies the power from the power supply unit 21 to the lens apparatus 200.

The imaging optical system included in the lens apparatus 200 is connected to the zoom operating ring 206, and includes a zoom unit 111 and a third lens unit (image stabilizing lens unit) 209. The zoom unit 111 moves in the optical axis direction to change the angle of view. The third lens unit 209 includes a shift barrel 303 that holds a first optical element (shift lens) 301 serving as an image stabilizing element that reduces the image blur. The third lens unit 209 performs an image stabilizing operation that moves (shifts) the shift barrel 303 in the Z/Y-axes directions orthogonal to the optical axis O and reduces the image blur. The imaging optical system also includes a diaphragm (aperture stop) 205 that performs a light amount adjusting operation, and a focus unit 204 that includes a focus lens that moves in the optical axis direction during focusing. The lens apparatus 200 includes an image stabilizing driver 305 that drives the third lens unit 209 to shift the shift barrel 303, a diaphragm driver 313 that drives the diaphragm 205, and a focus driver 203 for driving the focus unit 204 to move the focus unit 204. In this embodiment, the image stabilizing driver 305 is an image stabilizing actuator, and the focus driver 203 is a focus actuator.

The camera body 1 includes the shutter unit 14, the image sensor 15, he shutter driver 16, the image processor 17, and the camera controller 12. The shutter unit 14 controls an amount of light condensed by the imaging optical system in the lens apparatus 200 and exposed by the image sensor 15. The image sensor 15 photoelectrically converts the object image formed by the imaging optical system and outputs an image signal. The image processor 17 performs various image processing for the image signal and then generates an image signal. The display unit 9 displays the image signal (through image) output from the image processor 17, displays the imaging parameter as described above, or reproduces and displays a captured image recorded in the memory 13 or a recording medium (not illustrated).

The camera controller 12 controls driving the diaphragm 205 and the shutter unit 14 via the diaphragm driver 313 and the shutter driver 16 according to the F-number and the shutter speed set value received from the operation unit 11. The camera controller 12 controls driving the focus unit 204 in accordance with the imaging preparation operation (half-pressing operation) on the operation unit 11 (release button 5).

For example, when an autofocus operation is instructed, the focus detector 18 determines the focus state of the object image formed by the image sensor 15 based on the image signal generated by the image processor 17, generates the focus signal, and transmits it to the camera controller 12. At the same time, the focus driver 203 detects the current position of the focus unit 204 and transmits the signal to the camera controller 12 via the lens controller 103. The camera controller 12 compares the focus state of the object image with the current position of the focus unit 204, calculates a focus driving amount based on the shift amount, and transmits it to the lens controller 103. Then, the lens controller 103 controls driving the focus unit 204 to the target position via the focus driver 203, and corrects the focus shift of the object image.

When the auto-exposure control operation is instructed, the camera controller 12 receives the luminance signal generated by the image processor 17 and performs a photometric calculation. The camera controller 12 controls the diaphragm driver 313 of the diaphragm 205 based on the photometric calculation result in response to an imaging instruction operation (full pressing operation) on the operation unit 11 (release button 5). At the same time, the camera controller 12 controls driving the shutter unit 14 via the shutter driver 16, and performs the exposure processing by the image sensor 15.

The camera body 1 includes a pitch shake detector 19 and a yaw shake detector 20 as a shake detector that can detect an image shake such as a camera shake by the user. The pitch shake detector 19 and the yaw shake detector 20 respectively use an angular velocity sensor (vibration gyro) and an angular acceleration sensor, detect image blurs in the pitch direction (the rotation direction around the Z-axis) and the yaw direction (the rotation direction around the Y-axis) and output the shake signal. The camera controller 12 uses the shake signal from the pitch shake detector 19, and calculates the shift position of the shift barrel 303 in the Y-axis direction. Similarly, the camera controller 12 uses the shake signal from the yaw shake detector 20, and calculates the shift position of the shift barrel 303 in the Z-axis direction. The camera controller 12 controls driving the shift barrel 303 to the target position in accordance with the calculated shift position in the pitch/yaw directions, and performs an image stabilizing operation for reducing the image blur during the exposure or through image display.

In this embodiment, the lens microcomputer 201 may start controlling the image stabilizing operation of the image stabilizing mechanism 300 in response to the half-pressing operation by the user. More specifically, the lens microcomputer 201 integrates the angular velocity signal output from a sensor 202 that detects the shake of the lens apparatus 200, and calculates the angular displacement and its direction. Then, the lens microcomputer 201 can calculate a shift amount and a shift direction of the correction lens for reducing the image blur on the image sensor 15 based on the angular displacement, and drive the actuator (image stabilizing driver 305) described later according to the shift amount and the shift direction.

The lens apparatus 200 includes a zoom operating ring 206 for changing the angle of view of the imaging optical system, and a zoom detector 105 for detecting the rotation angle of the zoom operating ring 206. The zoom detector 105 detects the rotation angle of the zoom operating ring 206 operated by the user as an absolute value, and includes, for example, a resistance type linear potentiometer. Information on the angle of view detected by the zoom detector 105 is transmitted to the lens controller 103 and reflected on a variety of controls by the camera controller 12. On the other hand, part of various information is recorded in the memory 13 or a removable recording medium together with the captured image.

Structure of Zoom Operation

Figure 4:
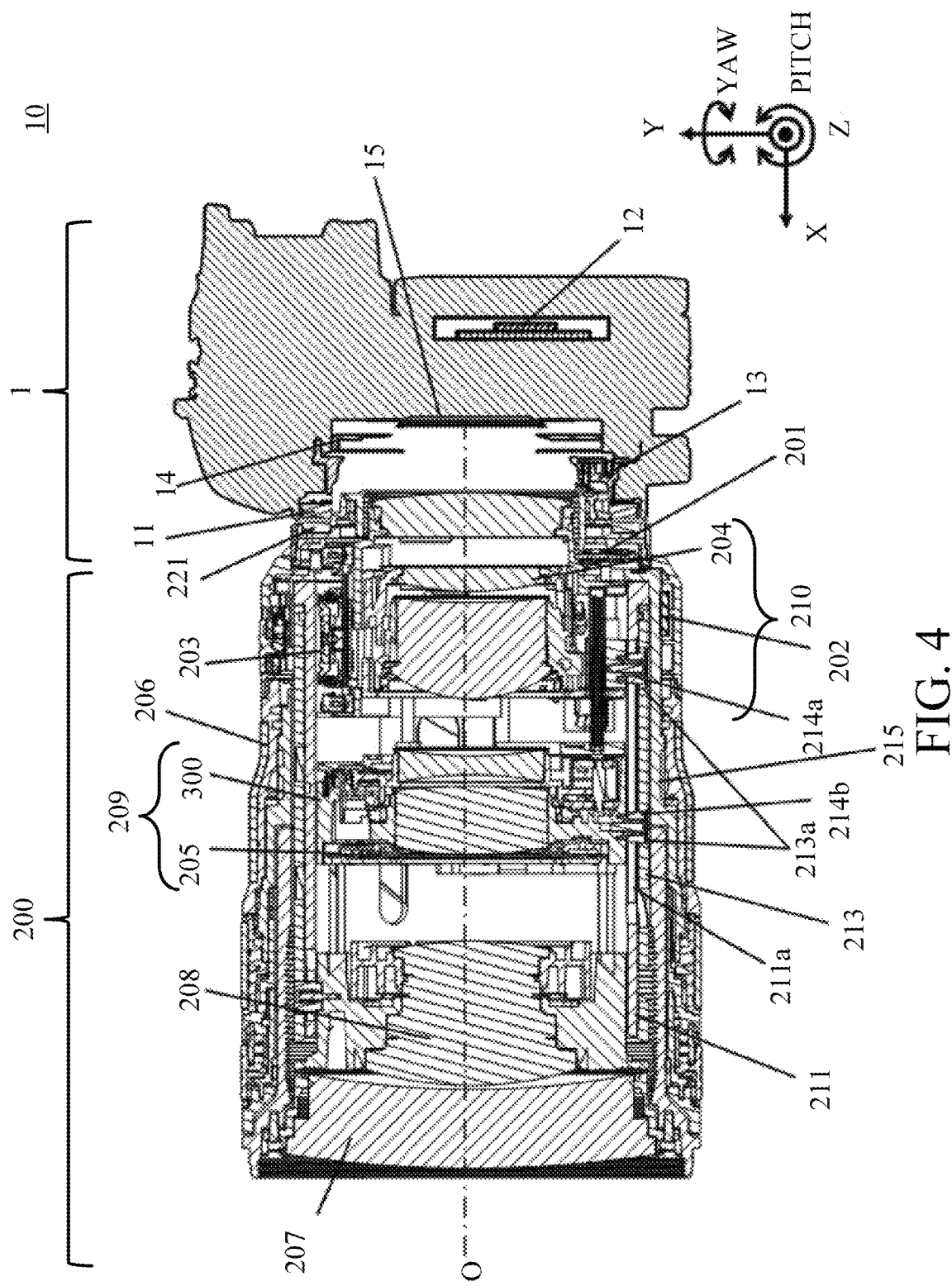
FIG. 4 is a sectional view (WIDE (wide-angle) state) of the image pickup apparatus according to this embodiment.
Figure 5:
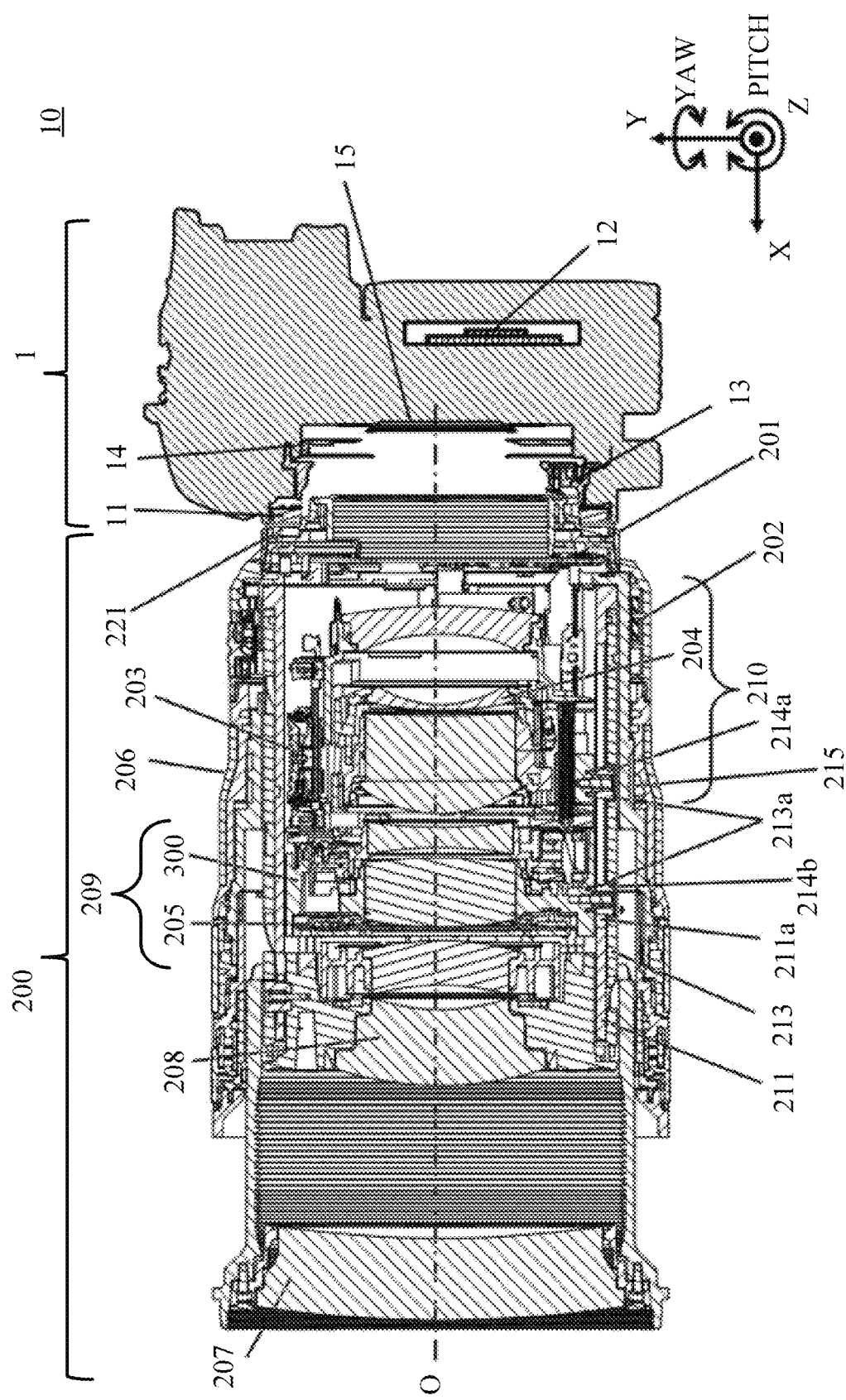
FIG. 5 is a sectional view (TELE (telephoto) state) of the image pickup apparatus according to this embodiment.

Referring now to FIGS. 4 and 5, a description will be given of a positional relationship among the components in the image pickup apparatus 10. FIGS. 4 and 5 are sectional views on the XY plane including the optical axis O. FIG. 4 illustrates the zoom-in state (WIDE (wide-angle) state), and FIG. 5 illustrates the zoom-out state (TELE (telephoto) state). A center line shown herein substantially coincides with the optical axis determined by the imaging optical system, and is therefore synonymous with the optical axis O below.

The lens apparatus 200 can change the angle of view of the imaging optical system. This embodiment adopts a six-unit configuration for the illustrative imaging optical system, but the present invention is not limited to this embodiment. Each lens unit moved to a predetermined optical position according to the angle of view forms an image of light from the object on the imaging plane of the image sensor 15. The lens unit includes, in order from the object side, a first lens unit 207, a second lens unit 208 including an adjusting unit, a third lens unit (image stabilizing lens unit) 209 including the diaphragm 205 and the image stabilizing mechanism 300, and fourth to sixth lens units (rear unit 210) including the focus unit 204. The adjusting unit of the second lens unit 208 is configured to maintain the optical performance of the overall imaging optical system by intentionally shifting and fixing the optical position. Moving the adjusting unit to a desired position while confirming the state of the overall optical performance will be able to cancel influences of manufacturing errors, assembly variations, etc., which may occur in each component. The present invention does not limit the configuration of the lens unit and for example, the third lens unit 209 or the rear unit 210 may serve as an adjusting unit. Some lens units may be unmovable or fixed.

The lens apparatus 200 includes the sensor 202 that detects shake of the lens apparatus 200 in the pitch/yaw directions. The sensor 202 includes, but is not limited to, an angular velocity sensor.

A cam barrel 213 connected to the zoom operating ring 206 is rotatably held around the optical axis O on the outer circumference of the linear guide barrel 211. The linear guide cylinder 211 has a linear guide groove 211a that restricts each zoom unit from moving in the rotation direction and guides the linear movement in the optical axis direction. The cam barrel 213 has a cam groove 213a having a different angle in the rotation direction corresponding to each zoom unit. On the other hand, each of the first to sixth lens units (zoom units) is provided with a cam follower, and each cam follower is engaged with the corresponding linear guide groove 211a and cam groove 213a. When the user rotates the zoom operating ring 206, the cam barrel 213 rotates, and the cam follower 214 simultaneously moves back and forth the respective zoom units in the optical axis direction by the engagement of the linear guide groove 211a and the cam groove 213a.

The linear guide tube 211 is fixed part fixed to the lens mount 221 via the fixed barrel 215. On the outer circumferential surface of the linear guide cylinder 211, bayonet claws (not illustrated) are disposed at regular-interval positions. On the other hand, an unillustrated circumferential groove is provided to the inner circumferential surface of the cam barrel 213. The cam barrel 213 is connected to the zoom operating ring 206. When the zoom operating ring 206 is rotated, the cam cylinder 213 rotates around the optical axis O by the engagement between the bayonet claws and the circumferential groove.

The zoom operating ring 206 has an unillustrated zoom detector that detects an angle. The zoom detector is configured to detect, as an absolute value, the angle of the zoom operating ring 206 operated by the user, and includes, for example, a resistance type linear potentiometer. Information on the angle of view detected by the zoom detector is transmitted to the lens microcomputer 201, and reflected on a variety of controls by the camera controller 12. On the other hand, part of various information is recorded in the recording medium together with the captured image.

Structure of Image Stabilizing Unit

Figure 6:
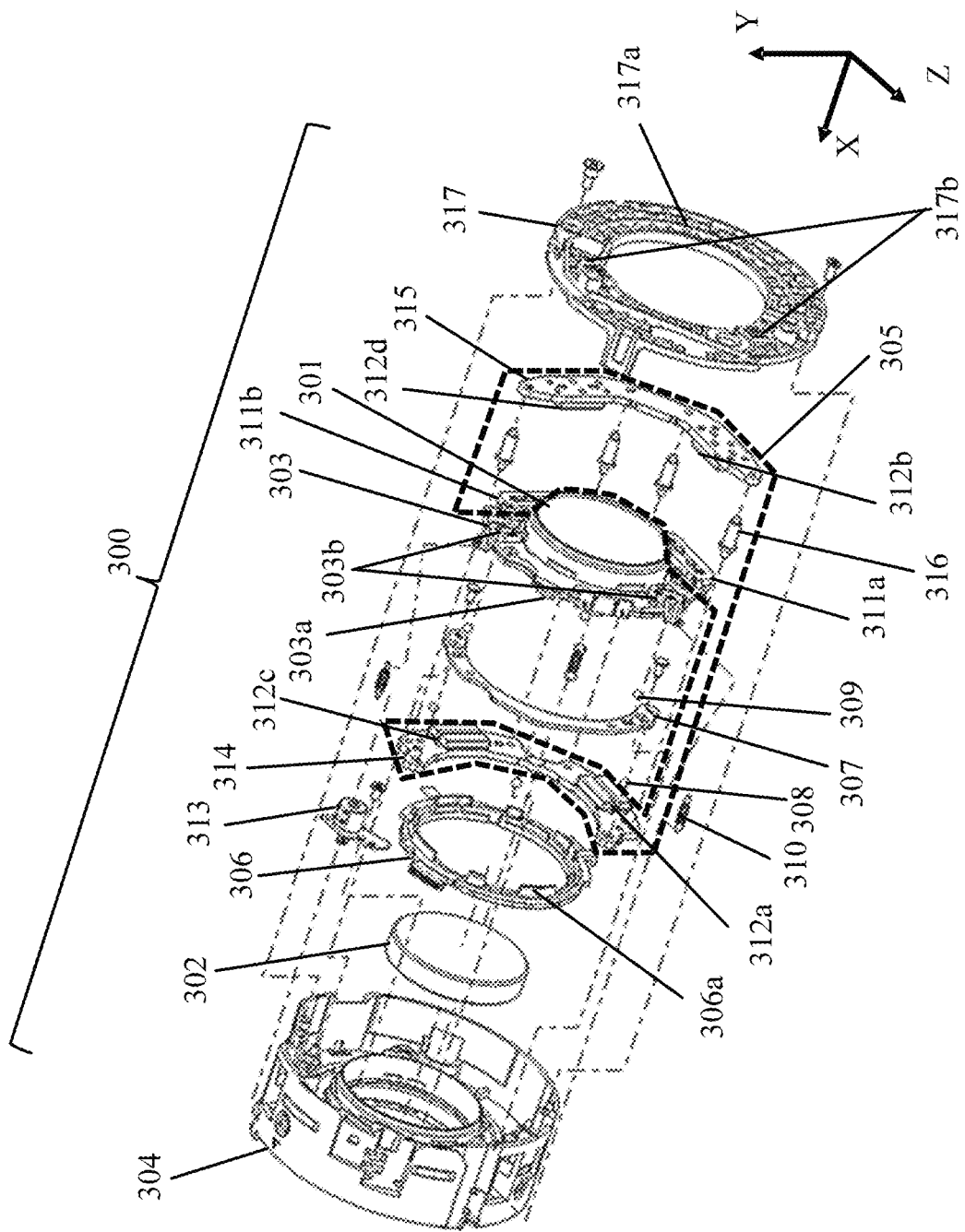
FIG. 6 is an exploded perspective view of an image stabilizing mechanism in this embodiment.

Referring now to FIG. 6, a description will be given of a configuration of the image stabilizing unit 300 according to this embodiment. FIG. 6 is an exploded perspective view of the image stabilizing unit 300. The image stabilizing unit 300 includes components described below.

Basic Configuration

The image stabilizing unit 300 includes a first optical element (correction lens) 301, a shift barrel 303, a base barrel 304, and a rotation preventive plate or member 307. The image stabilizing apparatus 300 further includes a plurality (three in this embodiment) of the first rollers 308, a plurality (three in this embodiment) of the second rollers 309, a biasing spring 310, and an image stabilizing driver 305 for driving the shift barrel 303 in the Z/Y-axes directions.

The base barrel 304 holds the second optical element 302, and includes, in the circumferential direction, three sets of three fixed parts fixed to the linear guide groove 211a and the cam groove 213a via the cam follower 214 and spring holders to which one end of each of the three biasing springs 310 is attached. The base barrel 304 has a flat surface receiver that contacts the first rollers 308.

The shift barrel 303 holds the first optical element 301 and shifts together with the first optical element 301 in the Z/Y-axes directions orthogonal to the optical axis O. The shift barrel 303 includes, in the circumferential direction, three sets of a plane receiver that contacts the first rollers 308, two V-shaped grooves that extend in the Y-axis direction and contact the second rollers 309, and the spring holder to which one end of each of the three biasing springs 310 is attached.

Actuator

The image stabilizing driver or actuator 305 includes a first coil 311a, a second coil 311b, a first magnet unit 312a, a second magnet unit 312b, a third magnet unit 312c, a fourth magnet unit 312c, and a fourth magnet unit 312d. The image stabilizing driver 305 further includes a first yoke 314, a second yoke 315, and a yoke holder 316.

The first coil 311a and the second coil 311b are fixed to the shift barrel 303 by a fixing member, such as an adhesive. The first coil 311a is located between the first magnet unit 312a and the second magnet unit 312b and is driven in the Y-axis direction. The second coil 311b is located between the third magnet unit 312c and the fourth magnet unit 312d and is driven in the Z-axis direction.

The first yoke 314 and the second yoke 315 are made of a magnetic material. The first yoke 314 is fixed to the base barrel 304 by a positioning member and a fixing member, such as a screw, and magnetically attracts and holds the first magnet unit 312a and the third magnet unit 312c. The second yoke 315 magnetically attracts and holds the second magnet unit 312b and the fourth magnet unit 312d. The first yoke 314 and the second yoke 315 are magnetically attracted to each other by the magnet units 312a to 312d, and hold a predetermined interval by holding the yoke holder 316.

When the first coil 311a and the second coil 311b are energized, a force in the Y-axis direction is generated in the first coil 311a by the electromagnetic force that acts between the magnet units 312a to 312d, and the shift barrel 303 is driven in the Y-axis direction. The driving direction of the shift barrel 303 is reversed depending on the energization direction of the first coil 311a. By controlling the current flowing through the first coil 311a by the lens microcomputer 201, the first optical element 301 held by the shift barrel 303 can be freely driven in the Y-axis direction to perform the image stabilizing control. This is similarly applied to driving in the Z-axis direction by energizing the second coil 311b.

Anti-Roll

One of the first rollers 308 is sandwiched between the flat receiver of the base barrel 304 and the flat receiver of the rotation preventive plate 307, and two of them are sandwiched between the V-shaped groove of the first yoke 314 extending in the Z-axis direction and the V-shaped groove of the rotation preventive plate 307 extending in the Z-axis direction. One of the second rollers 309 is sandwiched between the flat receiver of the first yoke 314 and the flat receiver of the shift barrel 303, and two of them are sandwiched between the V-shaped groove of the rotation preventive plate 307 extending in the Y-axis direction and the V-shaped groove of the shift barrel 303 extending in the Y axis direction. When the first rollers 308 and the second rollers 309 roll, the shift barrel 303 can be guided in the Z/Y axis directions without any loads, and regulate the rotation (roll) around the X-axis.

The biasing spring 310 is attached to the shift barrel 303 and the base barrel 304, and the shift barrel 303 applies a biasing force to the base barrel 304 in the X-axis direction via the first rollers 308, the second rollers 309, and the rotation preventive plate 307. Therefore, the shift barrel 303 is supported in the X-axis direction so as to be movable in the Z/Y-axes directions.

The cover member 317 is attached to the base barrel 304 with a screw or the like, and has an unillustrated contact surface in the X-axis direction with a predetermined gap between the cover member 317 and the shift barrel 303. When an impact is applied to the image stabilizing unit 300, the biasing force of the biasing spring 310 reduces, and the shift barrel 303 cannot be supported in the X-axis direction and lifts, the shift barrel 303 and the contact surface in the X-axis direction contact each other and suppress the lift above a predetermined level. This structure can prevent the component from falling off or getting damaged.

The cover member 317 has a position detector (detector) 317b in the Z/Y-axes directions of the shift barrel 303. The position detector 317b is a magnetic sensor such as a Hall sensor, and detects the magnetic field of the detecting magnet 303b of the shift barrel 303 opposite to the X-axis direction. The detected magnetic field receives arithmetic processing by the position detector 317b or the lens microcomputer 201 and is converted into the position of the shift barrel 303 in the Z/Y-axes directions, and is fed back to the current flowing through the first coil 311a and the second coil 311b.

Lock Ring

The shift barrel 303 has first protrusions 303a at a plurality of locations extending in the X-axis direction from the outer circumferential part of the first optical element 301. A lock member 306 is held on the base barrel 304 between the base barrel 304 and the image stabilizing driver 305 by the bayonet structure so as to be rotatable around the X-axis. The lock member 306 has second protrusions 306a at a plurality of locations extending in the X-axis direction from the outer circumferential part of the second optical element 302. When the lock member 306 rotates around the X-axis and the first protrusion 303a and the second protrusion 306a contact each other, the shift barrel 303 is fixed relative to the base barrel 304 in the Z/Y-axes directions.

The lock actuator 313 is controlled by the lens microcomputer 201 to rotate the lock member 306 around the X-axis, so as to switch a contact state in which the first protrusion 303a and the second protrusion 306a contact each other and a noncontact state. The image stabilizing apparatus 300 includes the above components and is assembled as a unit.

Positional Relationship Between Barrel and Biasing Member

Figure 7:
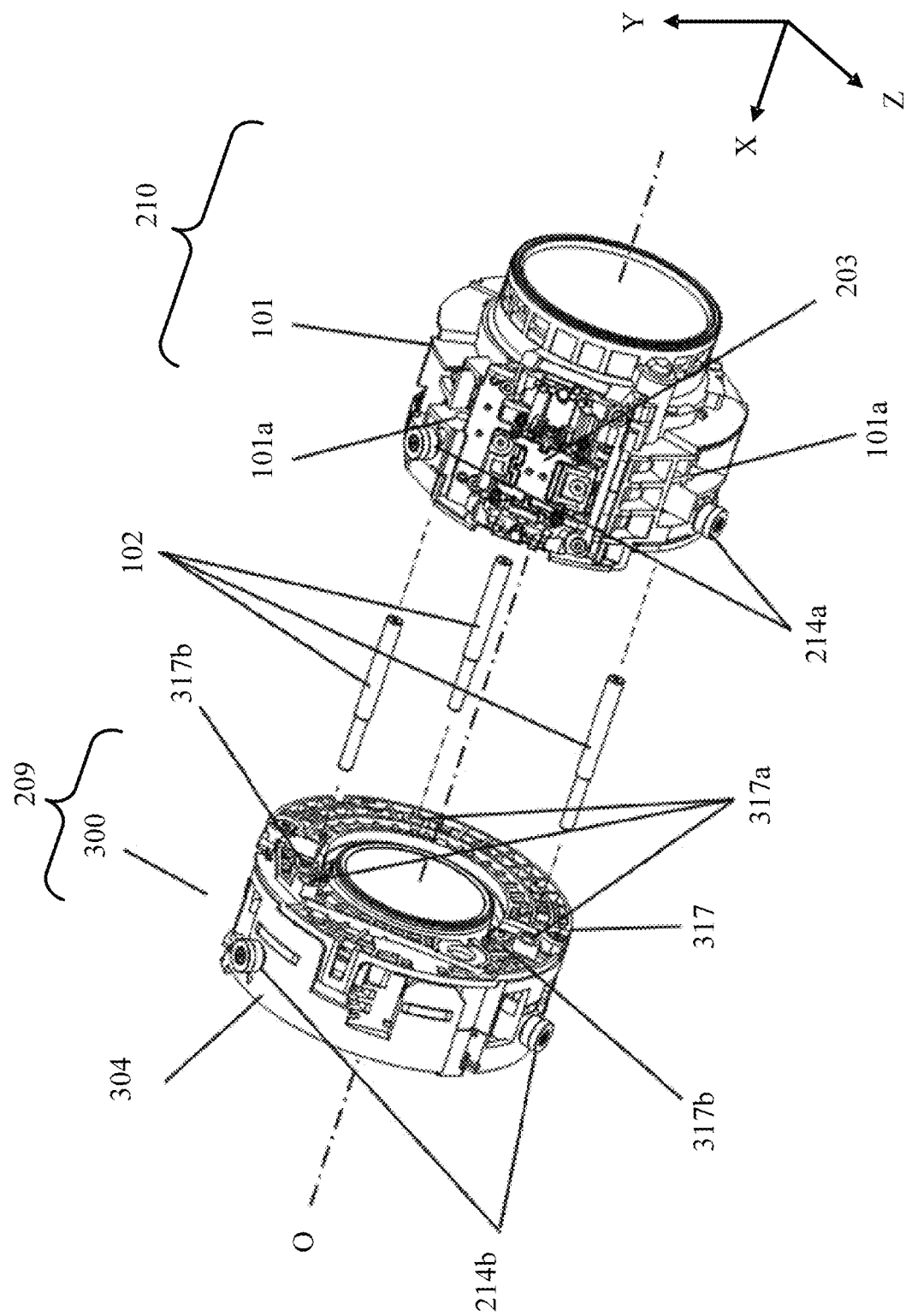
FIG. 7 is a partially exploded perspective view of the lens apparatus according to this embodiment.
Figure 8:
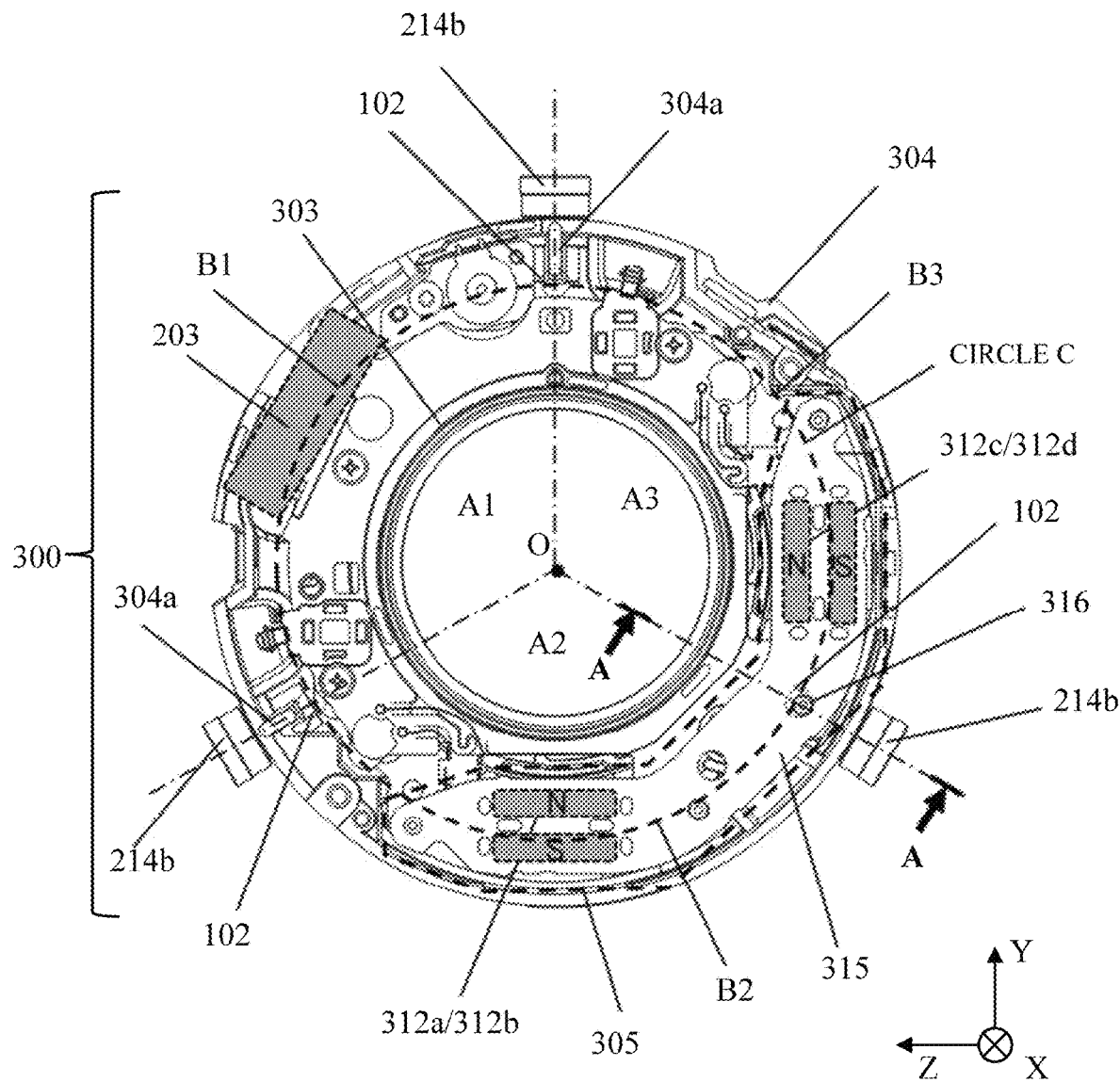
FIG. 8 is a projection view of the image stabilizing mechanism and a focus driver in an optical axis direction according to this embodiment.

Referring now to FIGS. 7 to 10, a description will be given of a positional relationship between the components of the third lens unit (image stabilizing lens unit) 209 and the rear unit 210 and the spring unit 102. FIG. 7 is a partially exploded perspective view showing the configuration around the third lens unit 209 and the rear unit 210 in the lens apparatus 200. FIG. 8 is a projection view in which the image stabilizing driver 305 and the focus driver 203 of the rear unit 210 are projected in the optical axis direction relative to the image stabilizing mechanism 300 as a reference.

As illustrated in FIG. 7, three spring units (biasing members) 102 are held between the third lens unit 209 and the rear unit 210. The spring unit 102 smoothly expands and contracts in the X-axis direction while applying a biasing force in the X-axis direction to the third lens unit 209 and the rear unit 210. In this embodiment, the spring unit 102 has a configuration in which the compression coil spring is included in the cylinder, but is not limited to that form as long as the biasing force in the X-axis direction is applied. The rear unit barrel (first lens holder) 101 of the rear unit 210 is provided with three holders 101a for holding the spring unit 102. The cover member 317 is provided with three contact portions (first contact portions) 317a with the end surface of the spring unit 102. The cam followers 214 are disposed at the same phases as the three spring units 102 around the X-axis.

As illustrated in FIG. 8, when the image stabilizing mechanism 300 is viewed from the X-axis direction, the three spring units 102 are located at the same phases with those of the cam followers 214b and closer to the optical axis O than the cam followers 214b. In this way, the spring unit 102 is disposed near the cam follower 214b. This is to maintain a mechanical balance by biasing the cam follower 214b supporting the third lens unit 209 near the central axis, and to restrain inclinations of the first optical element 301 and the second optical element 302 relative to the optical elements disposed in the rear unit 210.

In this embodiment, the cam follower (second cam follower) 214b of the third lens unit 209 and the cam follower (first cam follower) 214a of the rear unit 210 may have the same phase. In this embodiment, C is set to a circle formed by connecting the centers of the three spring units 102 (a circle having a radius between the spring unit 102 and the optical axis O). At this time, when viewed from the optical axis direction, the area enclosed by the circle C (circular area) overlaps at least part of each of the image stabilizing driver 305 and the focus driver 203. Assume that B1, B2, and B3 are arcs made by dividing the circle C by the spring unit 102, and A1, A2, and A3 are areas enclosed by the respective arcs B1 to B3 and the optical axis O among the circular areas. The focus driver 203 is disposed in the area (first area) A1, the pitch component (magnet unit 312a or 312b) of the image stabilizing driver 305 is disposed in the area (second area) A2, and the yaw component of the image stabilizing driver 305 (magnet unit 312c or 312d) is disposed in the area (third area) A3. By thus filling the space partitioned by the spring unit 102 with the respective actuators (focus driver 203, image stabilizing driver 305), the space in the X-direction projection is effectively utilized, and the third lens unit 209 and the rear unit 210 can be made smaller.

Figure 9:
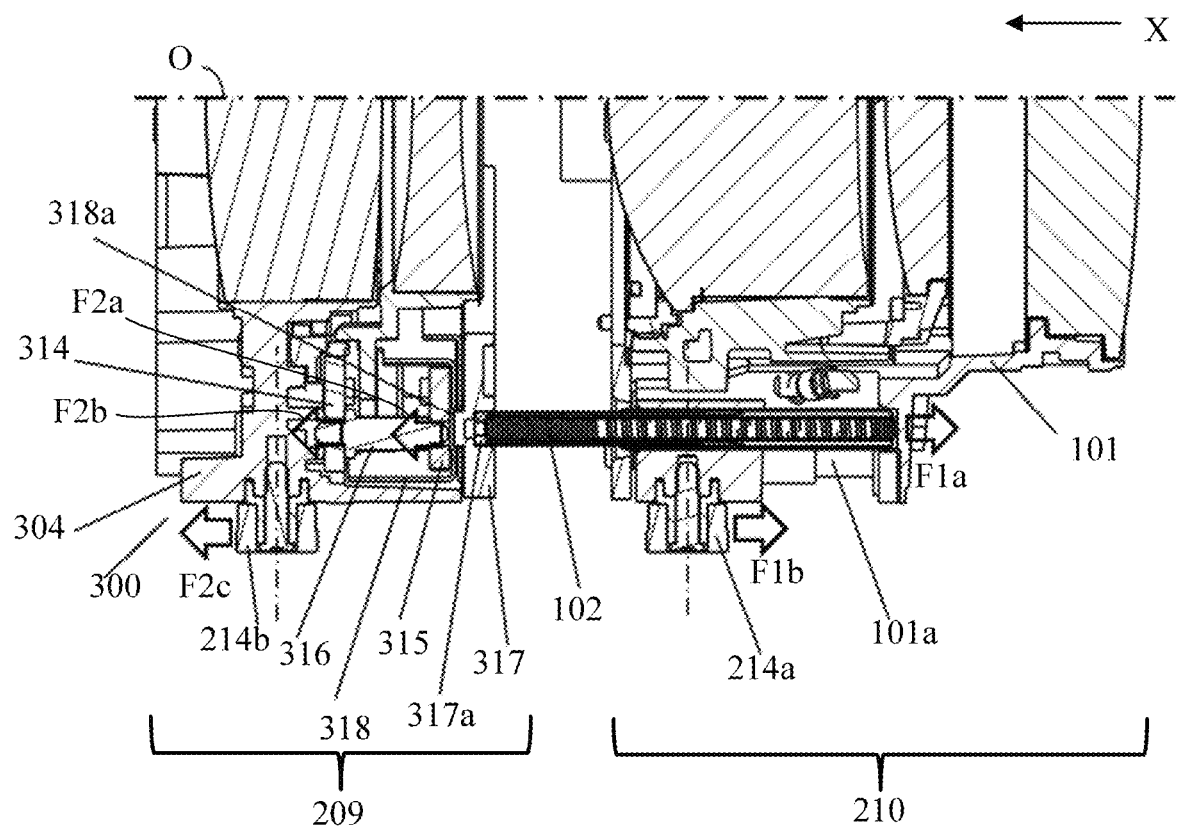
FIG. 9 is a partially sectional view (WIDE state) of the lens apparatus according to this embodiment.
Figure 10:
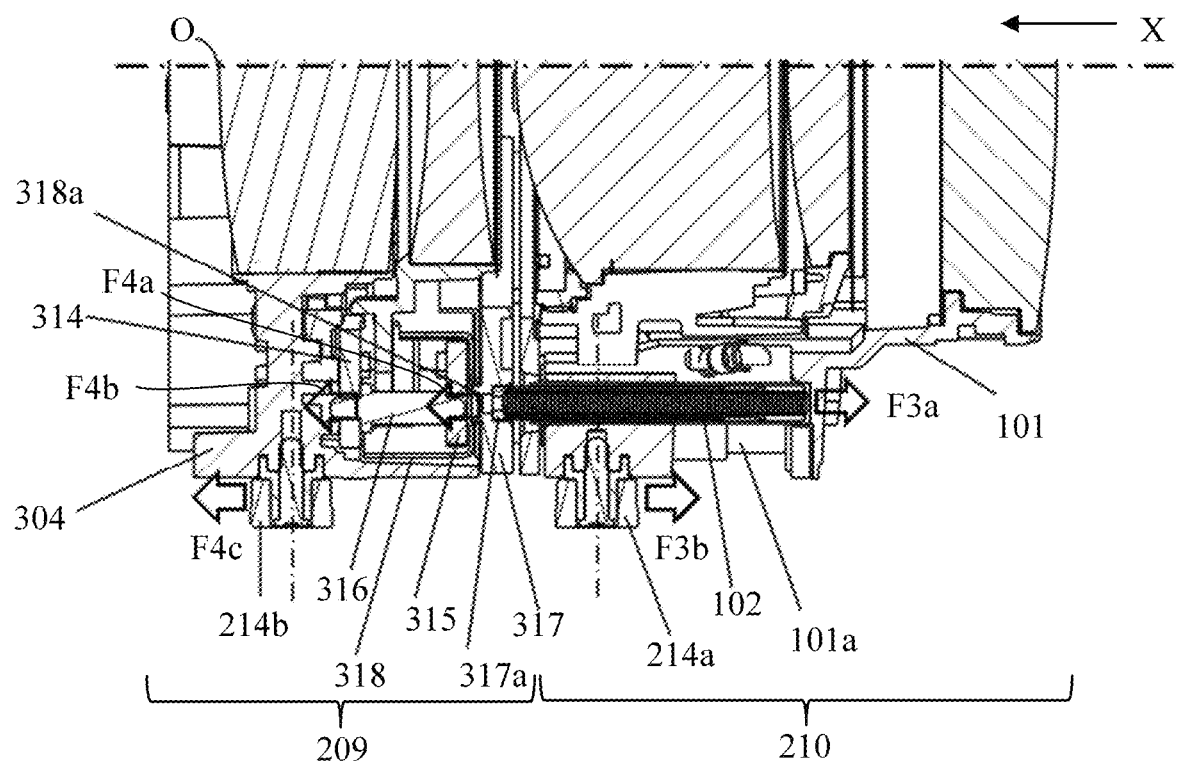
FIG. 10 is a partially sectional view (TELE state) of the lens apparatus according to this embodiment.

FIGS. 9 and 10 are sectional views taken along a line A-A in FIG. 8. FIG. 9 illustrates a WIDE state in which the third lens unit 209 and the rear unit 210 are most distant from each other, and FIG. 10 illustrates a TELE state in which the third lens unit 209 and the rear unit 210 are closest to each other. The spring unit 102 and the cam follower 214 are disposed at the same phase (approximately the same phase) around the X-axis. The spring unit 102 is disposed closer to the optical axis O than the cam followers 214a of the rear unit 210. The spring unit 102 and the cam follower 214a are disposed so as to overlap each other in the X-axis direction (on the YZ plane). Thereby, the degree of freedom of the spring length of the spring unit 102 can be improved in comparison with an arrangement in which the spring unit 102 and the cam follower 214a do not overlap each other. In other words, the spring constant of the spring unit 102 can be reduced by lengthening the spring of the spring unit 102, and the fluctuation of the load of the spring unit 102 can be reduced between the WIDE state and the TELE state, which will be described later.

Although the case where the spring unit 102 and the cam follower 214a of the rear unit 210 overlap each other in the optical axis direction has been described in this embodiment, the spring unit 102 and the cam follower 214b of the third lens unit 209 may overlap in the optical axis direction. Both the spring unit 102 and the cam followers 214a and 214b may overlap each other. Due to this configuration, the degree of freedom of the spring length of the spring unit 102 can be further improved.

The Way of Transmitting Load

In the WIDE state illustrated in FIG. 9, the spring unit 102 applies a load F1a to the rear unit 210, the stress is generated in a member around the spring unit 102 of the rear unit barrel 101, and the load is transmitted to the cam follower 214a. Thereby, the cam follower 214a contacts the linear guide groove 211a and the cam groove 213a with the load F1b. The spring unit 102 applies a load F2a to the image stabilizing mechanism 300, and the cover member 317 receives the load F2a at the contact portion 317a. In this embodiment, the contact portion 317a overlaps at least part of the yoke holder 316 when viewed from the optical axis direction. A shield member 318 for shielding the electromagnetic wave emitted from the image stabilizing driver 305 is sandwiched between the cover member 317 and the second yoke 315. The shield member 318 contacts the cover member 317 and the second yoke 315 at the contact portion (second contact portion) 318a. The load F2a generates the stress in the second yoke 315 and the yoke holder 316, and applies the load F2b to the first yoke 314. Since the first yoke 314 is fixed to the base barrel 304 as described above, the stress is generated in the base barrel 304 and the load is transmitted to the cam follower 214b. Thereby, the cam follower 214b is biased by the load F2c against the linear guide groove 211a and the cam groove 213a.

The lens apparatus 200 moves back and forth in the X-axis direction so that the third lens unit 209 and the rear unit 210 can be closer to each other from the WIDE state to the TELE state by the zoom operation described above. Along with this, the spring unit 102 is compressed in the X-axis direction, and the load that biases the third lens unit 209 and the rear unit 210 increases.

Similarly, in the TELE state illustrated in FIG. 10, the spring unit 102 applies a load F3a to the rear unit 210, the stress is generated in a member around the spring unit 102 of the rear unit barrel 101, and the load is transmitted to the cam follower 214a. Thereby, the cam follower 214a contacts the linear guide groove 211a and the cam groove 213a with the load F3*b*. The spring unit 102 applies a load F4*a* to the image stabilizing mechanism 300, and the cover member 317 receives the load F4*a* at the contact portion 317*a*. The load F4*a* generates the stress on the second yoke 315 and the yoke holder 316 via the contact portion 318*a* of the shield member 318, and applies the load F4*b* to the first yoke 314. The stress is generated from the first yoke 314 to the base barrel 304, and the load is transmitted to the cam follower 214*b*. Thereby, the cam follower 214*b* is biased by the load F4*c* against the linear guide groove 211*a* and the cam groove 213*a*.

Thus, the cam follower 214 is biased by the loads F1*b* and F2*c* in the WIDE state and by the loads F3*b* and F4*c* in the TELE state, respectively. Thereby, the second lens unit 209 and the rear unit 210 are forced against the linear guide groove 211*a* and the cam groove 213*a*, and the position can be stably held in the lens apparatus 200. In the transition area from the WIDE state to the TELE state, the position can be stably held in the same manner. In this embodiment, the contact portion 318*a* of the shield member 318 does not contact the yoke holder 316, but as long as the load is transmitted while it contacts at least one of the second yoke 315 and the yoke holder 316, its configuration is not limited.

Effects of the Embodiment

Next follows a description of the effects of this embodiment. In this embodiment, the spring unit 102 can be disposed at a position overlapping the image stabilizing driver 305 when viewed from the X-axis direction. Thus, the spring unit 102 can be disposed inside the cam follower 214 without enlarging the rear unit barrel 101 in the YZ plane direction, and the lens apparatus 200 can be made smaller. In particular, when the image stabilizing driver 305 and the focus driver 203 are disposed around the spring unit 102, the space can be effectively utilized and its diameter can be reduced by disposing them in each of the spaces divided by the spring unit 102.

The cam follower 214 and the spring unit 102 can be disposed at the same phase (approximately the same phase) around the X-axis by disposing the spring unit 102 inside the cam follower 214. The spring unit 102 overlaps the cam follower 214*a* of the rear unit 210 in the optical axis direction. Thereby, the spring length of the spring unit 102 can be made longer to reduce the spring constant, and fluctuations in the biasing force of the spring unit 102 in the WIDE state and the TELE state can be reduced. When the lens apparatus 200 receives a biasing force, the optical performance more or less changes due to the deformations and the resultant inclinations, the biasing force changes can be reduced, and the optical performance changes can be suppressed. By disposing the cam follower 214 and the spring unit 102 at the same phase around the X-axis, the biasing force can be transmitted to the cam follower 214 in the shortest path. Hence, it is possible to suppress the deformations of the rear unit barrel 101 and the base barrel 304 in the circumferential direction around the X-axis, and to suppress the changes in optical performance. Since the biasing force is applied directly above the yoke holder 316, the deformations and tilts of the second yoke 315 can be suppressed, and the biasing force can be stably obtained without impairing the performance of the image stabilizing driver 305. Since the shield member 318 is sandwiched between the cover member 317 and the second yoke 315 by the contact portion 318*a* without making a hole, the electromagnetic wave shielding performance is not deteriorated.

Thus, in this embodiment, the lens apparatus 200 includes the first lens holder (rear unit barrel 101), the second lens holder (base barrel 304), and the biasing member (spring unit 102). The first lens holder is held by the first cam follower (cam follower 214*a*) and is movable in the optical axis direction. The second lens holder is held by the second cam follower (cam follower 214*b*) and is movable in the optical axis direction. The biasing member is provided between the first lens holder and the second lens holder. The biasing member is disposed at the same phase (substantially the same phase) as that of at least one of the first cam follower and the second cam follower, and closer to the optical axis than at least one of the first cam follower and the second cam follower when viewed from the optical axis direction, and overlaps at least one of the first cam follower and the second cam follower in the optical axis direction.

The second cam follower may be disposed closer to the object than the first cam follower. When viewed from the optical axis direction, the biasing member is disposed at the same phase as that of each of the first cam follower and the second cam follower and closer to the optical axis than both the first cam follower and the second cam follower. The biasing member may overlap the first cam follower in the optical axis direction. The lens apparatus 200 may include the focus driver 203 provided in the first lens holder and the image stabilizing driver 305 provided to the second lens holder. When viewed from the optical axis direction, a circular area enclosed by a circle C formed by at least three biasing members overlaps at least part of the focus driver and the image stabilizing driver. Herein, in the circular area, three areas enclosed by the three arcs B1 to B3 divided by the biasing member and the optical axis are respectively defined as a first area (A1), a second area (A2), and the third area (A3). At this time, the focus driver may be disposed in the first area, and the image stabilizing driver may be disposed in the second area and the third area. The image stabilizing driver may include a first image stabilizing driver (first magnet unit 312*a*, second magnet unit 312*b*) for driving in the pitch direction and a second image stabilizing driver (third magnet unit 312*c*, fourth magnet unit 312*d*) for driving in the yaw direction. The first image stabilizing driver may be disposed in the second area, and the second image stabilizing driver may be disposed in the third area.

In this embodiment, the second lens holder has the image stabilizing mechanism 300. The image stabilizing mechanism includes a cover member 317 having a first contact portion (contact portion 317*a*) that contacts the biasing member, a plurality of yokes (second yokes 315), and a yoke holder 316 that holds the plurality of yokes. The first contact portion overlaps at least part of the yoke holder when viewed in the optical axis direction.

The cover member may have a detector (position detector 317*b*) that detects a moving amount of the image stabilizing mechanism. The image stabilizing mechanism may have a shield member 318. The shield member is sandwiched between the yoke and the cover member, and has a second contact portion (contact portion 318*a*) that contacts the cover member and at least one of the yoke and the yoke holder. The second contact portion may overlap at least part of the yoke holder when viewed in the optical axis direction. The biasing member may be disposed at the same phase (substantially the same phase) as that of at least one of the first cam follower and the second cam follower in the rotation direction around the optical axis.

This embodiment may provide a low-load and compact lens apparatus and image pickup apparatus, each of which can hold the lens holder with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138602, filed on Jul. 29, 2019, which is hereby incorporated by reference herein in its entirety.

What is claimed is:

1. A lens apparatus comprising:
a first lens holder held by a first cam follower and movable in an optical axis direction;
a second lens holder held by a second cam follower and movable in the optical axis direction; and
a biasing member provided between the first lens holder and the second lens holder;
a focus driver provided to the first lens holder; and
an image stabilizing driver provided to the second lens holder,
wherein the biasing member is disposed at the same phase as that of at least one of the first cam follower and the second cam follower and closer to an optical axis than the at least one when viewed from the optical axis direction, and the biasing member and the at least one reside within the same plane along the optical axis direction, and
wherein when viewed from the optical axis direction, a circular area enclosed by a circle formed by at least three biasing members overlaps at least part of the focus driver and the image stabilizing driver.

2. The lens apparatus according to claim 1, wherein the second cam follower is disposed closer to an object than the first cam follower.

3. The lens apparatus according to claim 1, wherein the biasing member is disposed closer to the optical axis of the same phase than the first cam follower and the second cam follower when viewed from the optical axis direction.

4. The lens apparatus according to claim 1, wherein the biasing member and the first cam follower reside within the same plane along the optical axis direction.

5. The lens apparatus according to claim 1, wherein the circular area includes a first area, a second area, and a third area, which are respectively enclosed by three arcs divided by the biasing members and the optical axis, and the focus driver is disposed in the first area, and the image stabilizing driver is disposed in the second area and the third area.

6. The lens apparatus according to claim 5, wherein the image stabilizing driver includes:
a first image stabilizing driver used for driving in a pitch direction; and
a second image stabilizing driver used for driving in a yaw direction,
wherein the first image stabilizing driver is disposed in the second area, and the second image stabilizing driver is disposed in the third area.

7. A lens apparatus comprising:
a first lens holder held by a first cam follower and movable in an optical axis direction;
a second lens holder including an image stabilizing mechanism, the second lens holder being held by a second cam follower and movable in the optical axis direction; and
a biasing member provided between the first lens holder and the second lens holder,
wherein the image stabilizing mechanism includes:
a cover member having a first contact portion that contacts the biasing member;
a plurality of yokes; and
a yoke holder configured to hold the plurality of yokes, and
wherein the first contact portion overlaps at least part of the yoke holder when viewed from the optical axis direction.

8. The lens apparatus according to claim 7, wherein the cover member includes a detector configured to detect a moving amount of the image stabilizing mechanism.

9. The lens apparatus according to claim 7, wherein the image stabilizing mechanism further includes a shield member,
wherein the shield member is sandwiched between the yoke and the cover member, and includes a second contact portion that contacts at least one of the yoke and the yoke holder and the cover member, and
wherein the second contact portion overlaps at least part of the yoke holder when viewed from the optical axis direction.

10. The lens apparatus according to claim 7, wherein the biasing member is disposed in the same phase as that of at least one of the first cam follower and the second cam follower in a rotation direction around the optical axis.

11. An image pickup apparatus comprising:
an image sensor; and
a lens apparatus,
wherein the lens apparatus includes:
a first lens holder held by a first cam follower and movable in an optical axis direction;
a second lens holder held by a second cam follower and movable in the optical axis direction;
a biasing member provided between the first lens holder and the second lens holder;
a focus driver provided to the first lens holder; and
an image stabilizing driver provided to the second lens holder,
wherein the biasing member is disposed at the same phase as that of at least one of the first cam follower and the second cam follower and closer to an optical axis than the at least one when viewed from the optical axis direction, and the biasing member and the at least one reside within the same plane along the optical axis direction, and
wherein when viewed from the optical axis direction, a circular area enclosed by a circle formed by at least three biasing members overlaps at least part of the focus driver and the image stabilizing driver.

* * * * *